(12) United States Patent     (10) Patent No.:    US 8,121,355 B2
Connell et al.                                       (45) Date of Patent:     *Feb. 21, 2012

(54) BRAIN SHAPE AS A BIOMETRIC

(75) Inventors: Jonathan H. Connell, Cortlandt Manor, NY (US); Chitra Dorai, Chappaqua, NY (US); Sunil J. Noronha, Chappaqua, NY (US); Nalini K. Ratha, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/145,015

(22) Filed: Jun. 24, 2008

(65) Prior Publication Data

US 2008/0253621 A1    Oct. 16, 2008

Related U.S. Application Data

(63) Continuation of application No. 11/405,330, filed on Apr. 17, 2006, now abandoned.

(51) Int. Cl.
*G06K 9/78* (2006.01)

(52) U.S. Cl. ...... 382/115; 340/5.52; 340/5.82; 382/128; 713/186

(58) Field of Classification Search .................... 382/115
See application file for complete search history.

(56) References Cited

U.S. PATENT DOCUMENTS

| | | | | |
|---|---|---|---|---|
| 6,219,439 | B1* | 4/2001 | Burger | 382/115 |
| 6,611,630 | B1* | 8/2003 | Miller et al. | 382/293 |
| 2001/0026634 | A1* | 10/2001 | Yamaguchi | 382/118 |
| 2002/0138768 | A1* | 9/2002 | Murakami et al. | 713/202 |
| 2002/0154793 | A1* | 10/2002 | Hillhouse et al. | 382/115 |
| 2003/0007690 | A1* | 1/2003 | Rajagopal et al. | 382/209 |
| 2003/0033266 | A1* | 2/2003 | Schott et al. | 706/45 |
| 2003/0125634 | A1* | 7/2003 | Eda et al. | 600/544 |
| 2004/0158155 | A1* | 8/2004 | Njemanze | 600/454 |
| 2005/0063567 | A1* | 3/2005 | Saitoh et al. | 382/115 |
| 2006/0078183 | A1* | 4/2006 | deCharms | 382/128 |
| 2006/0104433 | A1* | 5/2006 | Simpson et al. | 379/266.07 |
| 2006/0104494 | A1* | 5/2006 | Collins et al. | 382/128 |
| 2008/0267509 | A1* | 10/2008 | Springorum et al. | 382/201 |

OTHER PUBLICATIONS

Hartmann et al., "Automatic 3-D Segmentation of Internal Structures of the Head in MR Images Using a Combination of Similarity and Free-Form Transformations: Part II, Validation on Severely Atrophied Brains," Oct. 1999, IEEE Transaction on Medical Imaging, vol. 18, pp. 917-926.*

Herbert et al., "Dissociations of cerebral cortex, subcortical and cerebral white matter volumes in autistic boys," Brain, May 1, 2003, pp. 1182-1192.*

Connell et al., U.S. Appl. No. 11/405,330, filed Apr. 17, 2006, Office Action Summary, Jun. 22, 2009, 9 pages.

Connell et al., U.S. Appl. No. 11/405,330, filed Apr. 17, 2006, Office Action Summary, Dec. 14, 2009, 12 pages.

Acclair, "Have a Wonderful Journey", http://www.acclair.co.uk/home.html.

* cited by examiner

*Primary Examiner* — John Lee (74) *Attorney, Agent, or Firm* — Preston J. Young; Hoffman Warnick LLC (57) ABSTRACT

The invention provides a method, system, and program product for identifying an individual using biometric data based on the individual's brain. In one embodiment, the invention includes constructing a biometric signature based on at least one of: features within a two-dimensional scan of the individual's brain and a difference in features between at least two two-dimensional scans of the individual's brain.

21 Claims, 6 Drawing Sheets

BRAIN SHAPE AS A BIOMETRIC

CROSS-REFERENCE TO RELATED APPLICATIONS

This application is a continuation of U.S. patent application Ser. No. 11/405,330, filed 17 Apr. 2006, now abandoned which is hereby incorporated herein.

BACKGROUND OF THE INVENTION

1. Technical Field

The invention relates generally to biometrics, and more particularly, to a method, system, and program product using brain shape as a biometric.

2. Background Art

The use of biometric data to identify individuals is known. Fingerprints, for example, have been used for over a century to identify and distinguish individuals. More recently, biometric data have been included in computerized databases, making such identifications quicker and, in general, more reliable.

The breadth of biometric data currently used in the identification of individuals has increased dramatically in recent years. Systems designed to identify individuals based on facial images, iris images, and other physical characteristics are now routinely used to limit access to secure locations and to identify individuals.

For example, biometric data associated with persons authorized to access to a secure location may be stored in a database and linked to an access point. All persons wishing to enter the secure area must submit to a collection of biometric data at the access point, which is then compared to the database of biometric data associated with individuals authorized to access the secure location. If the collected biometric data do not match biometric data within the database, the individual is denied access to the secure location.

Similarly, a database may be compiled of biometric data associated with individuals who are being sought or tracked by a law enforcement agency. For example, a database of facial images of known criminals or terrorists may be linked to a system designed to capture facial images of individuals in public spaces, such as shopping centers and airports. In the event that a facial image is captured by such a system and matches an image in a database containing facial images of known criminals or terrorists, a law enforcement agency may choose to apprehend or monitor the individual whose facial image was captured.

A significant shortcoming of most known biometric systems, however, is that they rely on physical features that may be altered. Such alteration may be made with the intent of mimicking the biometric of another individual (e.g., someone who has been authorized to access a secure area) or of avoiding identification (i.e., obscuring one's own biometric to avoid it being matched to a biometric in a biometric database). For example, facial features may be easily altered by plastic surgery or obscured with a mask or prosthetic device. Iris images may be counterfeited with contact lenses or obscured with contact lenses or glasses. Even fingerprints may be counterfeited and are easily obscured by gloves.

To this extent, a need exists for methods and systems for identifying an individual that do not suffer from the defects above.

SUMMARY OF THE INVENTION

The invention provides a method, system, and program product for identifying an individual using biometric data based on the individual's brain. In one embodiment, the invention includes constructing a biometric signature based on at least one of: features within a two-dimensional scan of the individual's brain and a difference in features between at least two two-dimensional scans of the individual's brain.

A first aspect of the invention provides a method for identifying an individual using biometric data, the method comprising: obtaining biometric data associated with the brain of an individual using a non-invasive measurement technique in a known coordinate frame using a registration technique; extracting characteristics from the biometric data using a feature extraction technique; comparing the extracted characteristics with other characteristics, stored in a database, extracted from other biometric data; and determining whether the extracted characteristics match characteristics stored in the database.

A second aspect of the invention provides a system for identifying an individual using biometric data, the system comprising: a system for obtaining biometric data associated with the brain of an individual using a non-invasive measurement technique; a system for extracting characteristics from the biometric data using a feature extraction technique; a system for comparing the extracted characteristics with other characteristics, stored in a database, extracted from other biometric data; and a system for determining whether the extracted characteristics match characteristics stored in the database.

A third aspect of the invention provides a program product stored on a computer-readable medium, which when executed, attempts to identify an individual using biometric data, the program product comprising: program code for obtaining biometric data associated with the brain of an individual using a non-invasive measurement technique; program code for extracting characteristics from the biometric data using a feature extraction technique; program code for comparing the extracted characteristics with other characteristics, stored in a database, from other biometric data; and program code for determining whether the extracted characteristics match characteristics stored in the database.

A fourth aspect of the invention provides a method for deploying an application for identifying an individual using biometric data, comprising: providing a computer infrastructure being operable to: obtain biometric data associated with the brain of an individual using a non-invasive measurement technique; extract characteristics from the biometric data using a feature extraction technique; compare the extracted characteristics with other characteristics, stored in a database, from other biometric data; and determine whether the extracted characteristics match characteristics stored in the database.

The illustrative aspects of the present invention are designed to solve the problems herein described and other problems not discussed, which are discoverable by a skilled artisan.

BRIEF DESCRIPTION OF THE DRAWINGS

These and other features of this invention will be more readily understood from the following detailed description of the various aspects of the invention taken in conjunction with the accompanying drawings that depict various embodiments of the invention, in which.

It is noted that the drawings of the invention are not to scale. The drawings are intended to depict only typical aspects of the invention, and therefore should not be considered as limiting the scope of the invention. In the drawings, like numbering represents like elements between the drawings.

DETAILED DESCRIPTION

As indicated above, the invention provides a method, system, and program product for identifying an individual using biometric data based on the individual's brain. More particularly, the invention includes the use of biometric data related to the geometry of the individual's brain. As used herein, brain geometry includes the overall shape of the brain as a whole, and surface and/or interior features of the brain (e.g., its texture), and the location of functional regions based on brain activity.

Biometric data derived from internal portions of the body are more difficult to deliberately alter than are external portions of the body. Still, internally-derived biometrics are not free from alteration, whether deliberate or otherwise. Organ transplantation, cosmetic and/or reconstructive implantations, and skeletal alterations due to injury and/or surgery all have the ability to alter a biometric derived from internal portions of the body.

The structure of the brain, however, is not easily altered, as any such alteration carries with it the risk of serious and permanent impairment of an individual's ability to function or maintain basic bodily functions. In addition, the detailed foldings of the cerebrum and cerebellum are relatively constant over an individual's lifetime and are epigenetic (i.e., the detailed folding is different between identical twins). Even physiological conditions, such as dehydration, and degenerative disorders, such as Parkinson's Disease, while capable of altering the overall appearance of the brain's surface, do not alter the presence or relative locations of the folds of the cerebrum or cerebellum. All of these characteristics make the structure of the brain, in general, and the folding patterns of the cerebrum and/or cerebellum, in particular, ideal features for use as a biometric.

Just as geometric features of the brain make identification of an individual inviolable, behavioral measurements obtained from the brain can also uniquely identify an individual. For example, in a resting state, behavioral measurements computed from sensing various differential metabolic activities in the brain, such as oxygen intake, blood flow, etc., cannot be altered consciously by an individual and can therefore be used to identify an individual or distinguish one individual from another. These behavioral measurements can be obtained by gathering functional magnetic resonance imaging (fMRI) sequences of the brain.

Further, behavioral measurements can also be obtained from the brain of an individual in response to a particular stimulus such as showing an image to an individual and recording the brain activity occurring in response to this stimulus using fMRI sequences. Techniques such as fMRI can determine the specific location of brain regions used in the visual processing of this stimulus, the memory retrieval of a similar prior object, the selection of a linguistic name for the object, the generation of a response sentence, and the motor activation for articulation of the spoken response. Brain biometrics can be based both on the location and extents of the brain regions involved, and also the temporal pattern of transitions between them as response generation progresses. While it is conceivable that an individual may go to the length of controlling their external body reaction to the stimulus shown, it is difficult or impossible to deliberately control the regions of the brain activated by the stimulus or their timings.

Figure 1:
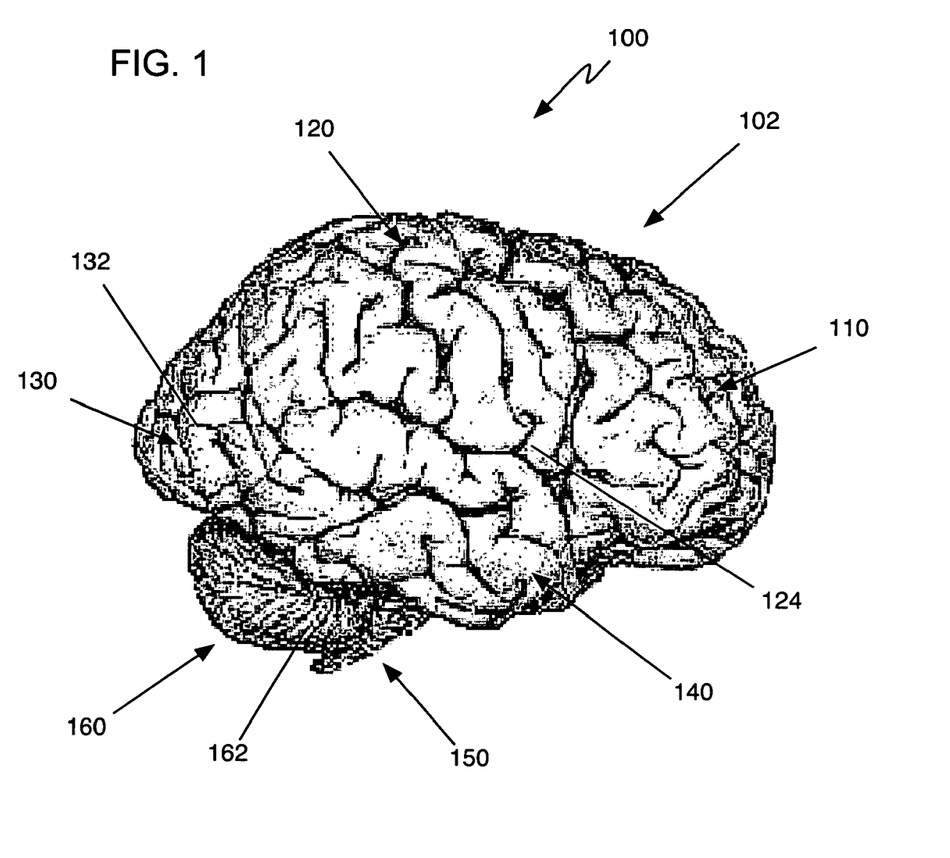
FIG. 1 shows an image of a human brain.

Referring to FIG. 1, an illustration of an exterior surface of a human brain 100 is shown. The cerebrum 102 is shown comprising the frontal lobe 110, the parietal lobe 120, the occipital lobe 130, and the temporal lobe 140. Also shown are the cerebellum 160 and medulla oblongata 150.

Preferred features of the brain 100, from which biometric data useful in the present invention may be derived, include the position, depth, and curvature of sulci 124, 132 (i.e., superficial depressions of the grey matter) of the cerebrum 102 and folia 162 (i.e., laminated depressions) of the cerebellum 160. Often, the position, depth, and curvature of such features can be determined from a cross-sectional image of the brain, as may be obtained using any known or later-developed imaging device, method, or system. Suitable non-invasive methods include, for example, X-Ray, magnetic resonance imaging (MRI), positron emission tomography (PET), and computerized axial tomography (CAT).

Figure 2:
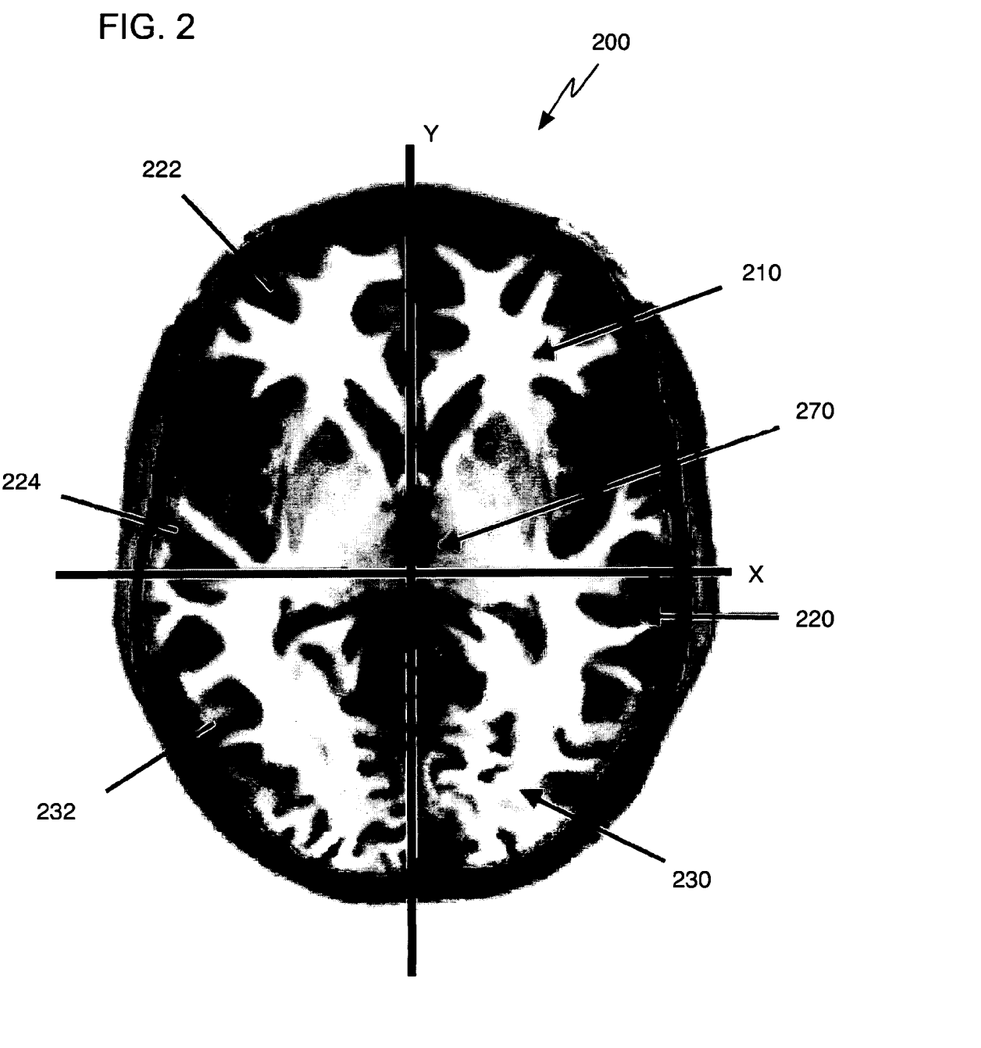
FIG. 2 shows an illustrative two-dimensional magnetic resonance imaging (MRI) scan of a human brain, suitable for use in practicing the invention.

For example, FIG. 2 shows a two-dimensional MRI scan 200 of a cross section of the brain along the X and Y axes. The frontal lobe 210, parietal lobe 220, and occipital lobe 230 are visible, as is the mid brain 270. Sulci 222, 224, 232 are visible in MRI scan 200, just as they are visible along an exterior surface of the brain, as in FIG. 1.

A single two-dimensional scan, such as MRI scan 200, may be used as a biometric for an individual. For example, a biometric signature may be derived from features of MRI scan 200. By way of example, a distance may be determined between a feature of mid brain 270 (e.g., its center) and sulcus 232. Preferably, a plurality of such distances is determined (e.g., between mid brain 270 and sulcus 222; between mid brain 270 and sulcus 224; between sulcus 222 and sulcus 224; etc.) and a biometric signature derived therefrom. Methods for the derivation of such signatures are known, particularly within the field of biometrics. Accordingly, any known or later-developed method for deriving a biometric signature may be used.

In particular, a biometric may be formed using the depth of each sulcus (or fissure) relative to the exterior brain (or lobe) surface, and its position relative to an anatomical coordinate system based on the position of the center of the mid-brain 270 and the central dividing fissure. Other coordinate systems, such as Talairach space based on the anterior and posterior commissures, may also be used. This canonicalization process helps transform data obtained at different times into representations in a standard brain-based coordinate frame so that they can be compared (as opposed to just recording the raw image coordinates of each feature).

In addition to local geometric features, such as the sulci, global geometric characteristics may also be used to form biometric signatures. Such characteristics include the overall volume of the brain, its length to width ratio, its left-right asymmetry, and the fractal dimension of the surface (perimeter squared versus area in two dimensions).

To ensure that a two-dimensional scan of an individual's brain taken at one time will match a similar scan taken at another time, it helps to make sure the plane of each scan is registered with respect to the overall brain in the same way.

This registration might be accomplished, for example, by aligning the scanning equipment with respect to easily observable external features of the individual. In a preferred embodiment, registration is performed by aligning the two-dimensional scanner in the plane that contains the individual's ear canals and the midpoint between the eye sockets. While certain skull features can be reshaped with plastic surgery, the location of these perceptual orifices is difficult and dangerous to alter.

In a preferred embodiment, the invention comprises the derivation of a biometric signature from features of a plurality of images of the brain, such as MRI scan 200. That is, a preferred method includes obtaining a plurality of images of the brain, preferably at varying imaging depths through the brain, and deriving a "three-dimensional" biometric signature therefrom.

Figure 3:
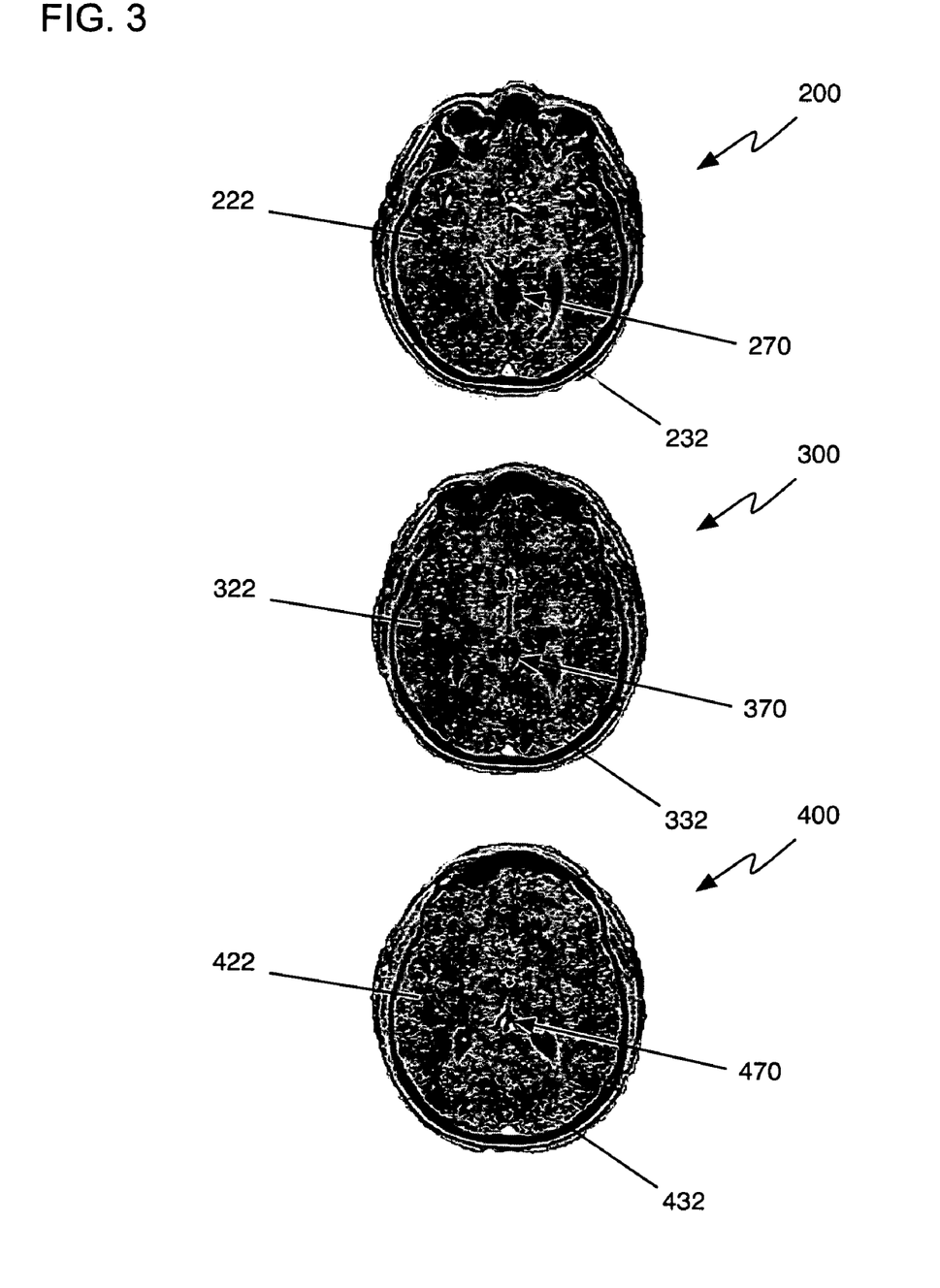
FIG. 3 shows illustrative two-dimensional MRI scans taken at different depths of a human brain, suitable for use in practicing the invention.

For example, in FIG. 3, a plurality of two-dimensional MRI scans 200, 300, 400 taken at varying depths through the brain is shown. As described above, a biometric signature may be derived using features of each MRI scan individually. There are well-known techniques for reassembling such slices into a three-dimensional model of the brain's surface and its interior. From these three-dimensional models, views such as that shown in FIG. 1 may be obtained. Such a three-dimensional model provides much more information about the geometry of the brain, particularly the folding pattern in the cerebrum 102 and cerebellum 160.

In a three-dimensional model, the orthogonal depth of a fold (such as 132 in FIG. 1) relative to the surface may be measured more accurately. Moreover, the position of such a feature may be recorded with more detail (e.g. $\{r, theta\}$ in a two-dimensional model versus $\{r, theta, phi\}$ in a three-dimensional model). As with the two-dimensional cases, the choice of a canonical coordinate system for representing these coordinates may be based on anatomical features detected in the data. These include overall features of the brain, such as its moments of inertia, as well as the positions and orientations of certain easily observed internal features such as the commissures, medulla oblongata, lateral geniculate body, etc.

Figure 4A:
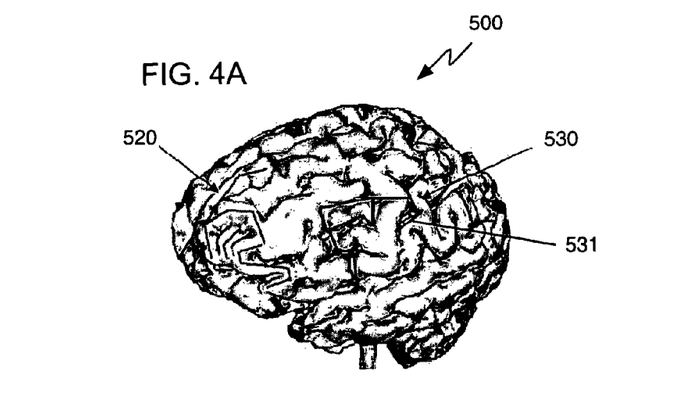
FIGS. 4A-C show an illustrative MRI scan of a brain and illustrative biometric signatures derived therefrom.
Figure 4B:
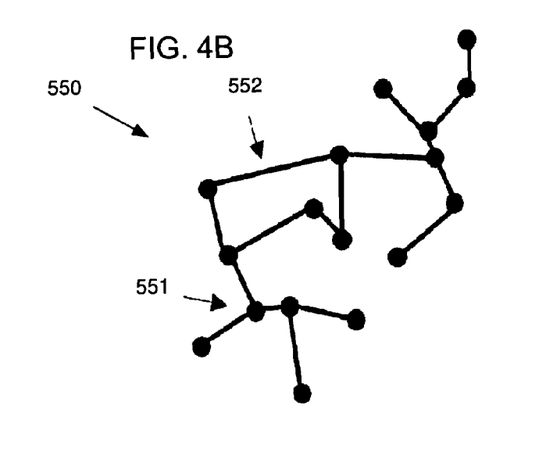

The branching pattern of the sulci may also be recorded as a biometric. For example, a graph of bifurcation nodes along with the inter-node distances encodes the fold connectivity information for a particular brain. FIG. 4A shows a three-dimensional surface model 500 computed from a plurality of two-dimensional slices. In three-dimensional model 500, a number of sulci 530 have been traced with linear segments 531. In FIG. 4B, the resulting graph model 550 consists of nodes 551 where several sulci meet or one sulcus has a major turn, and links 552 which run along the individual sulci. Each link may optionally be parameterized with its length and/or angle. Similarly, each node may optionally be parameterized by its three-dimensional position and/or its offset from other nodes in graph 550.

Figure 4C:
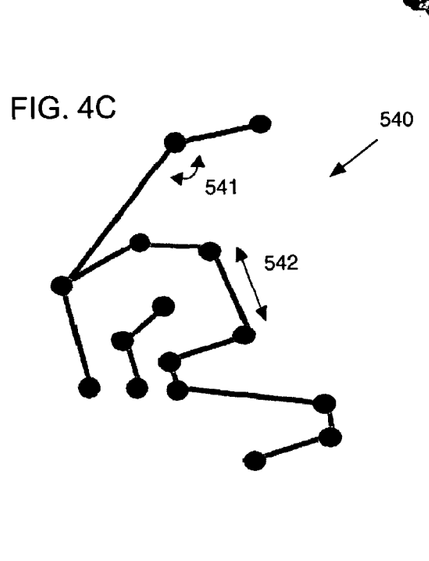

Alternatively, the dual of this, the pattern of gyri between the sulci may be recorded. This might be done by finding the medial axis of each gyrus and segmenting this skeletonized representation at points of high curvature. In FIG. 4A, the skeleton of selected gyri is shown as 520. The resulting semi-linear segments could be assembled into a graph 540, shown in FIG. 4C, augmented with the segment lengths 542 and join angles 541, to represent the overall gyrus pattern for later matching.

As will be recognized by one skilled in the art, the use of biometric data or a biometric signature to identify an individual requires the comparison of obtained biometric data or a biometric signature derived from such data to a database containing the biometric data or biometric signatures of known origin. As such, the same or substantially the same methods (e.g., scanning technology, biometric signature algorithm, etc.) must be used with respect to both the obtained biometric data or biometric signature and the biometric data or biometric signatures stored in the database.

Figure 5:
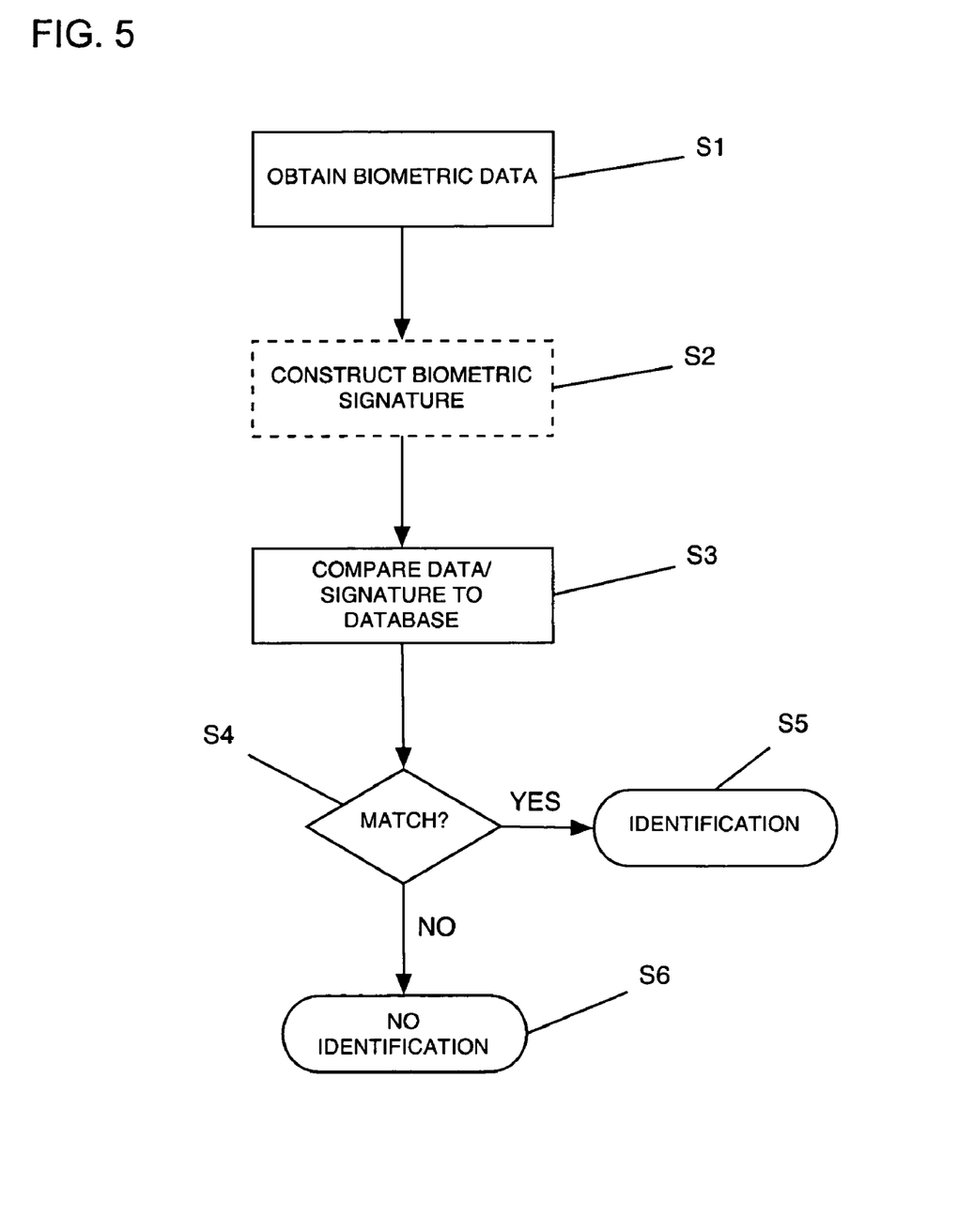
FIG. 5 shows a flow diagram of an illustrative method according to the invention.

Referring now to FIG. 5, a flow diagram of an illustrative method according to the invention is shown. First, at step S1, biometric data are obtained from an individual to be identified. As explained above, such data may be obtained using any number of methods, devices, or systems, including, for example, an MRI device. Next, at optional step S2, a biometric signature is derived from the biometric data obtained at step S1. At step S3, one or both of the biometric data obtained at step S1 and the biometric signature derived at step S2 are compared to biometric data and/or biometric signatures stored in a database.

At step S4, it is determined whether the obtained biometric data and/or derived biometric signature match biometric data and/or biometric signatures stored in the database. If a match is found, an identification is declared at step S5. If a match is not found, no identification is declared at step S6.

Figure 6:
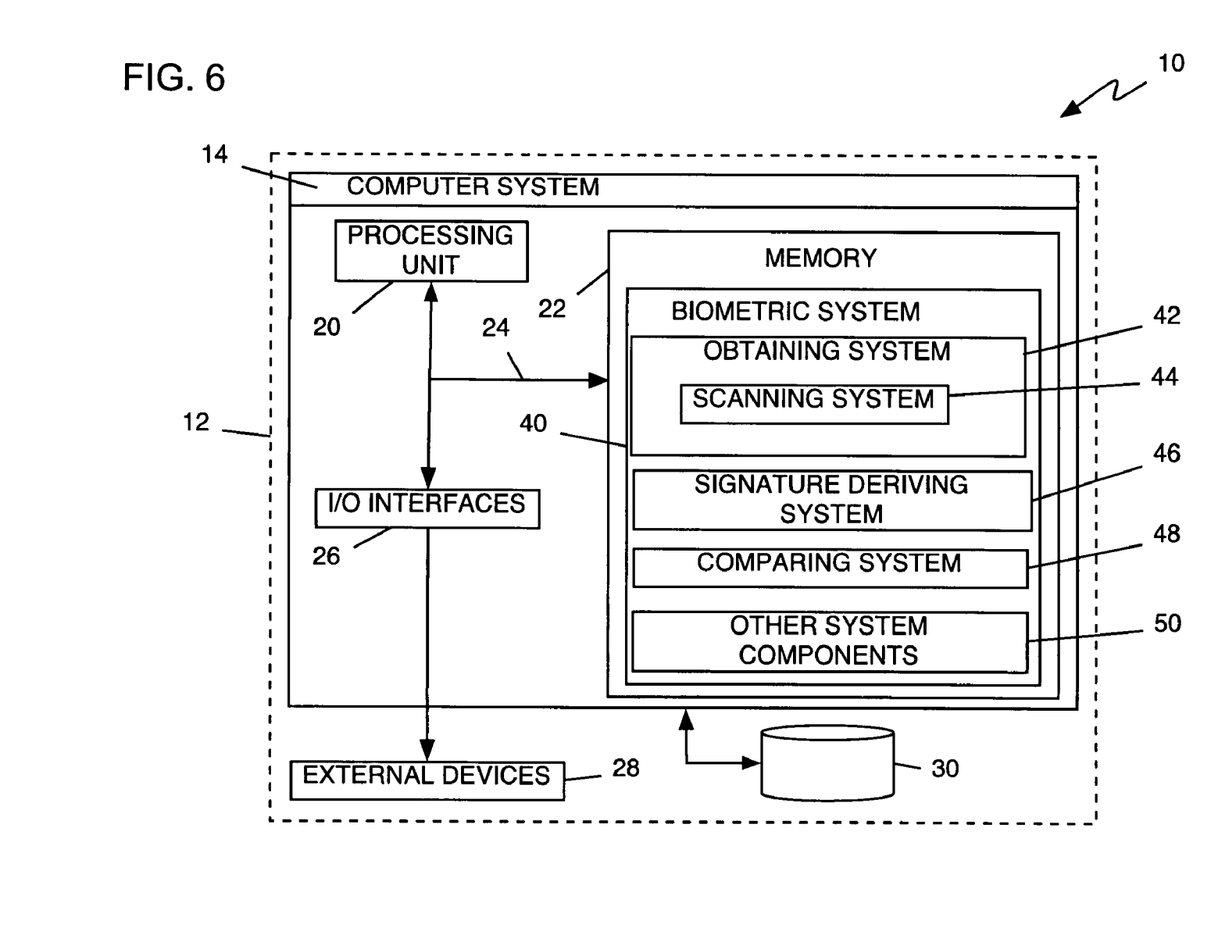
FIG. 6 shows a block diagram of an illustrative system according to the invention.

FIG. 6 shows an illustrative system 10 for identifying an individual using biometric data based on the individual's brain. To this extent, system 10 includes a computer infrastructure 12 that can perform the various process steps described herein for identifying an individual using biometric data based on the individual's brain. In particular, computer infrastructure 12 is shown including a computer system 14 that comprises a biometric system 40, which enables computer system 14 to identify an individual using biometric data based on the individual's brain by performing the process steps of the invention.

Computer system 14 is shown including a processing unit 20, a memory 22, an input/output (I/O) interface 26, and a bus 24. Further, computer system 14 is shown in communication with external devices 28 and a storage system 30. As is known in the art, in general, processing unit 20 executes computer program code, such as biometric system 40, that is stored in memory 22 and/or storage system 30. While executing computer program code, processing unit 20 can read and/or write data from/to memory 22, storage system 30, and/or I/O interface 26. Bus 24 provides a communication link between each of the components in computer system 14. External devices 28 can comprise any device that enables a user (not shown) to interact with computer system 14 or any device that enables computer system 14 to communicate with one or more other computer systems.

In any event, computer system 14 can comprise any general purpose computing article of manufacture capable of executing computer program code installed by a user (e.g., a personal computer, server, handheld device, etc.). However, it is understood that computer system 14 and biometric system 40 are only representative of various possible computer systems that may perform the various process steps of the invention. To this extent, in other embodiments, computer system 14 can comprise any specific purpose computing article of manufacture comprising hardware and/or computer program code for performing specific functions, any computing article of manufacture that comprises a combination of specific purpose and general purpose hardware/software, or the like. In each case, the program code and hardware can be created using standard programming and engineering techniques, respectively.

Similarly, computer infrastructure 12 is only illustrative of various types of computer infrastructures for implementing the invention. For example, in one embodiment, computer infrastructure 12 comprises two or more computer systems (e.g., a server cluster) that communicate over any type of wired and/or wireless communications link, such as a network, a shared memory, or the like, to perform the various process steps of the invention. When the communications link comprises a network, the network can comprise any combination of one or more types of networks (e.g., the Internet, a wide area network, a local area network, a virtual private network, etc.). Regardless, communications between the computer systems may utilize any combination of various types of transmission techniques.

As previously mentioned, biometric system 40 enables computer system 14 to identify an individual using biometric data based on the individual's brain. To this extent, biometric system 40 is shown including an obtaining system 42, which includes a scanning system 44, a signature deriving system 46, and a comparing system 48. Operation of each of these systems is discussed above. Biometric system 40 may further include other system components 50 to provide additional or improved functionality to biometric system 40. It is understood that some of the various systems shown in FIG. 6 can be implemented independently, combined, and/or stored in memory for one or more separate computer systems 14 that communicate over a network. Further, it is understood that some of the systems and/or functionality may not be implemented, or additional systems and/or functionality may be included as part of system 10.

While shown and described herein as a method and system for identifying an individual using biometric data based on the individual's brain, it is understood that the invention further provides various alternative embodiments. For example, in one embodiment, the invention provides a computer-readable medium that includes computer program code to enable a computer infrastructure to identify an individual using biometric data based on the individual's brain. To this extent, the computer-readable medium includes program code, such as biometric system 40, that implements each of the various process steps of the invention. It is understood that the term "computer-readable medium" comprises one or more of any type of physical embodiment of the program code. In particular, the computer-readable medium can comprise program code embodied on one or more portable storage articles of manufacture (e.g., a compact disc, a magnetic disk, a tape, etc.), on one or more data storage portions of a computer system, such as memory 22 and/or storage system 30 (e.g., a fixed disk, a read-only memory, a random access memory, a cache memory, etc.).

In another embodiment, the invention provides a business method that performs the process steps of the invention on a subscription, advertising, and/or fee basis. That is, a service provider could offer to identify an individual using biometric data based on the individual's brain, as described above. In this case, the service provider can create, maintain, support, etc., a computer infrastructure, such as computer infrastructure 12, that performs the process steps of the invention for one or more customers. In return, the service provider can receive payment from the customer(s) under a subscription and/or fee agreement and/or the service provider can receive payment from the sale of advertising space to one or more third parties.

In still another embodiment, the invention provides a method of generating a system for identifying an individual using biometric data based on the individual's brain. In this case, a computer infrastructure, such as computer infrastructure 12, can be obtained (e.g., created, maintained, having made available to, etc.) and one or more systems for performing the process steps of the invention can be obtained (e.g., created, purchased, used, modified, etc.) and deployed to the computer infrastructure. To this extent, the deployment of each system can comprise one or more of (1) installing program code on a computer system, such as computer system 14, from a computer-readable medium; (2) adding one or more computer systems to the computer infrastructure; and (3) incorporating and/or modifying one or more existing systems of the computer infrastructure, to enable the computer infrastructure to perform the process steps of the invention.

As used herein, it is understood that the terms "program code" and "computer program code" are synonymous and mean any expression, in any language, code or notation, of a set of instructions intended to cause a computer system having an information processing capability to perform a particular function either directly or after either or both of the following: (a) conversion to another language, code or notation; and (b) reproduction in a different material form. To this extent, program code can be embodied as one or more types of program products, such as an application/software program, component software/a library of functions, an operating system, a basic I/O system/driver for a particular computing and/or I/O device, and the like.

The foregoing description of various aspects of the invention has been presented for purposes of illustration and description. It is not intended to be exhaustive or to limit the invention to the precise form disclosed, and obviously, many modifications and variations are possible. Such modifications and variations that may be apparent to a person skilled in the art are intended to be included within the scope of the invention as defined by the accompanying claims.

What is claimed is:

1. A method for identifying an individual using biometric data, the method comprising:
    obtaining biometric data associated with a shape of the brain of an individual using a device capable of performing at least one non-invasive measurement technique;
    extracting characteristics from the biometric data using a feature extraction technique;
    comparing the extracted characteristics with other characteristics, stored in a database, extracted from other biometric data;
    determining whether the extracted characteristics match characteristics stored in the database; and
    in the case that the extracted characteristics match characteristics stored in the database, identifying the individual as the individual having the matching characteristics stored in the database.

2. The method of claim 1, wherein the biometric data includes geometric measurements.

3. The method of claim 2, wherein the geometric measurements are based on a folding pattern of at least one of the following: the cerebrum and the cerebellum.

4. The method of claim 3, wherein the geometric measurements include at least one of the following: fold connectivity information and fold depths.

5. The method of claim 2, wherein the geometric measurements are based on at least one of the following: a two-dimensional image of the brain and a three-dimensional image of the brain.

6. The method of claim 5, further comprising:
    aligning the geometric measurements in a standard coordinate frame using a canonicalization process.

7. The method of claim 2, wherein the feature extraction technique computes at least one of the following: global characteristics of the geometric measurements and local characteristics of the geometric measurements.

8. The method of claim 1, wherein obtaining includes obtaining the biometric data in a known coordinate frame using a registration technique.

9. The method of claim 1, wherein the biometric data includes behavioral measurements.

10. The method of claim 9, wherein the behavioral measurements are based on differential metabolic activity.

11. The method of claim 9, wherein the behavioral measurements are recorded in response to a stimulus.

12. The method of claim 9, wherein the behavioral measurements are based on a changing pattern of region activations over time.

13. A system for identifying an individual using biometric data, the system comprising:
- a system for obtaining biometric data associated with a shape of the brain of an individual using a non-invasive measurement technique;
- a system for extracting characteristics from the biometric data using a feature extraction technique;
- a system for comparing the extracted characteristics with other characteristics, stored in a database, extracted from other biometric data;
- a system for determining whether the extracted characteristics match characteristics stored in the database; and
- a system for identifying the individual as the individual having the matching characteristics stored in the database.

14. The system of claim 13, wherein the biometric data includes geometric measurements based on a folding pattern of at least one of the following: the cerebrum and the cerebellum.

15. The system of claim 13, wherein the system for obtaining biometric data includes a system for obtaining the biometric data in a known coordinate frame using a registration technique.

16. The system of claim 13, wherein the biometric data includes behavioral measurements based on differential metabolic activity.

17. A non-transitory computer-readable storage medium containing a program product, which when executed, attempts to identify an individual using biometric data, the program product comprising:
- program code for obtaining biometric data associated with a shape of the brain of an individual using a non-invasive measurement technique;
- program code for extracting characteristics from the biometric data using a feature extraction technique;
- program code for comparing the extracted characteristics with other characteristics, stored in a database, from other biometric data;
- program code for determining whether the extracted characteristics match characteristics stored in the database; and
- program code for identifying the individual as the individual having the matching characteristics stored in the database.

18. The non-transitory computer-readable storage medium of claim 17, wherein the biometric data includes geometric measurements based on a folding pattern of at least one of the following: the cerebrum and the cerebellum.

19. The non-transitory computer-readable storage medium of claim 17, wherein the program product further comprises:
- program code for aligning the measurements in a standard coordinate frame using a canonicalization process.

20. The non-transitory computer-readable storage medium of claim 17, wherein the biometric data includes behavioral measurements based on differential metabolic activity.

21. A method for deploying an application for identifying an individual using biometric data, comprising:
providing a computer infrastructure being operable to:
- obtain biometric data associated with a shape of the brain of an individual using a non-invasive measurement technique;
- extract characteristics from the biometric data using a feature extraction technique;
- compare the extracted characteristics with other characteristics, stored in a database, from other biometric data;
- determine whether the extracted characteristics match characteristics stored in the database; and
- identify the individual as the individual having the matching characteristics stored in the database.

* * * * *